(12) United States Patent
Teitelbaum et al.

(10) Patent No.: US 6,356,678 B1
(45) Date of Patent: Mar. 12, 2002

(54) OPTICAL DEFLECTION SWITCH

(75) Inventors: Neil Teitelbaum, Ottawa; Robert I. MacDonald, Manotick, both of (CA)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/465,455

(22) Filed: Dec. 17, 1999

(51) Int. Cl.$^7$ ................................ G02B 6/26; G02B 6/42
(52) U.S. Cl. ..................... 385/18; 385/16; 385/19; 385/22; 385/25; 385/36; 385/47; 359/128
(58) Field of Search ............................. 385/16, 18, 19, 385/22, 25, 36, 47; 359/128

(56) References Cited

U.S. PATENT DOCUMENTS

| | | | | |
|---|---|---|---|---|
| 4,329,017 A | * | 5/1982 | Kapany | 385/22 |
| 5,444,801 A | | 8/1995 | Laughlin | 385/16 |
| 5,555,558 A | | 9/1996 | Laughlin | 385/16 |
| 5,566,260 A | | 10/1996 | Laughlin | 385/16 |
| 5,647,033 A | * | 7/1997 | Laughlin | 385/16 |

OTHER PUBLICATIONS

Dale Murray et al., "Scalable Optical Swtich Using Rotating Refarctive Plates", National Fiber Optics Engineers Confference, Sept. 1998, pp. 373–382.*

* cited by examiner

Primary Examiner—Cassandra Spyrou
Assistant Examiner—Leo Boutsikaris
(74) Attorney, Agent, or Firm—Neil Teitelbaum

(57) ABSTRACT

The invention discloses an optical deflection switch which uses the output focal plane of a lens more effectively. This is achieved by combining a tapered block of a light-transmissive material having a reflective surface and a second face, wherein the second face includes an input/output port and the reflective surface provides reflection of a beam of light passing through the input/output port into the tapered block with a first block of a light-transmissive material having a first face and a second face, wherein the first face includes an input port thereon for receiving a collimated beam of light and the second face is for providing total internal reflection of the beam of light in a first switching state and for acting as an output/input port for optical communication with the input/output port of the switching block when the total internal reflection is frustrated in a second switching state. The reflective face of the switching block and the second face of the second block have an angle other than zero defined therebetween. The optical deflection switch further includes a rotator for turning the switching block around an axis into one of a plurality of selectable positions, each of the plurality of selectable positions for changing a plane of incidence of the beam of light.

14 Claims, 4 Drawing Sheets

OPTICAL DEFLECTION SWITCH

FIELD OF THE INVENTION

This invention relates to optical switches and in particular to an optical switch having a plurality of switching positions.

BACKGROUND OF THE INVENTION

In optical communication systems it is often necessary to switch an optical signal between different optical paths, be it along an optical waveguide such as an optical fiber, or in free space. Optical switching devices may generally be classified into moving-beam switches and moving-fiber switches. Moving-beam switches redirect the optical signal path between stationary waveguides or in free space. Moving-fiber switches physically change the location of optical fibers to be switched.

Different categories of optical switches for switching optical signals include electrical switches, solid-state switches, mechanical switches, and optical switches and combinations therebetween.

Electrical switches convert an optical signal to an electrical signal and then switch the electrical signal by conventional switching techniques. Electrical switches then convert the electrical signal back into an optical signal. Electrical switches are faster then existing mechanical switches but are also significantly more expensive. Furthermore, electrical switching of optical signals is bandwidth limited since a converted electrical signal can not carry all the information in an optical signal. This bandwidth limitation of electrical switches severely limits the advantages of using fiber optics.

Solid-state optical switches have fast switching speeds and the same bandwidth capacity as fiber optics. However, the cost for solid-state optical switches is 30 to 100 times more than those for existing mechanical switches. Another disadvantage of solid-state optical switches is that they incur insertion losses exceeding 20 times those for existing mechanical optical switches.

Mechanical optical switches are typically lower in cost than electrical or solid-state optical switches, provide low insertion loss, and are compatible with the bandwidth of fiber optics The activation mechanism used in the optical deflection switch of the present invention is a moving-beam switch mechanism.

An exemplary optical fiber switch that utilizes a moving mirror to perform the switching function is disclosed by Levinson in U.S. Pat. No. 4,580,873 issued Apr. 8, 1986 which is incorporated herein by reference. Although this invention appears to adequately perform its intended function, it is believed too costly and somewhat complex.

There have been several designs of optical deflection switches using Frustrated Total Internal Reflection (FTIR) to accomplish switching or modulation of an optical signal. In almost all cases these systems begin with air gap which produces total internal reflection, and then rapidly drives the material to less than one tenth wavelength spacing to produce frustrated total internal reflection. Such systems are disclosed in U.S. Pat. Nos. 4,249,814; 3,649,105; 3,559,101; 3,376,092; 3,338,656; 2,997,922; and 2,565,514. In all of these systems there is a problem in overcoming friction and damage to the glass.

Another exemplary moving-beam optical switch that redirects the optical signal path between stationary waveguides is disclosed in U.S. Pat. No. 5,444,801 to Laughlin incorporated herein by reference. The invention described therein teaches an apparatus for switching an optical signal from an input optical fiber to one of a plurality of output optical fibers. This apparatus includes means for changing the angle of the collimated beam with respect to the reference so that the output optical signal is focused on one of the plurality of output optical fibers. Similar mechanical optical switches are disclosed in U.S. Pat. Nos. 5,647,033; 5,875,271; 5,959,756; 5,555,558; 5,841,916; and 5,566,260 to Laughlin incorporated herein by reference.

Laughlin teaches switching of optical signals between input fibers and output fibers through shifting of one or more virtual axis of the system by changing the position of a second reflector between multiple positions. This second reflector has a wedge shape to change the angle of the collimated beam by a selected amount to direct the beam to different output locations. However, the output locations are all lying along a diameter in the output focal plane of the GRIN lens as shown in FIG. 1.

It is an object of the invention to provide an optical deflection switch having more switching positions than provided for in Laughlin's prior art optical switches. This is achieved by using the output focal plane of a lens more effectively.

Further, it is an object of the invention to provide an optical deflection switch in which the output beam is more confined to the center of the lens as in comparison to prior art optical switches while still being able to switch an optical signal to a plurality of fibers.

SUMMARY OF THE INVENTION

In accordance with the invention there is provided an optical deflection switch comprising: a) a tapered block of a light-transmissive material having a reflective surface and a second face, the second face including an input/output port and the reflective surface for providing reflection of a beam of light passing through the input/output port in to the tapered block; b) a first block of a light-transmissive material having a first face and a second face, the first face including an input port thereon for receiving a collimated beam of light and the second face for providing total internal reflection of the beam of light in a first switching state and for acting as an output/input port for optical communication with the input/output port of the switching block when the total internal reflection is frustrated in a second switching state, and an angle defined between the reflective face of the switching block and the second face of the second block being other than zero; and c) a rotator for turning the switching block around an axis into one of a plurality of selectable positions, each of the plurality of selectable positions for changing a plane of incidence of the beam of light.

In accordance with the invention there is further provided an optical deflection switch comprising: a first block of a light-transmissive material having an input port and a plurality of output ports at an end face thereof; and a switching block of a light-transmissive material having at least two non-parallel outer faces, said switching block being optically coupled with the first block in at least a first switching mode, and wherein the switching block is relatively rotatable with the first block in the at least first switching mode for reflecting a beam of light to the output ports, said beam of light being received from the input port.

BRIEF DESCRIPTION OF THE DRAWINGS

Exemplary embodiments of the invention will now be described in accordance with the drawings in which.

DETAILED DESCRIPTION OF THE INVENTION

Figure 1:
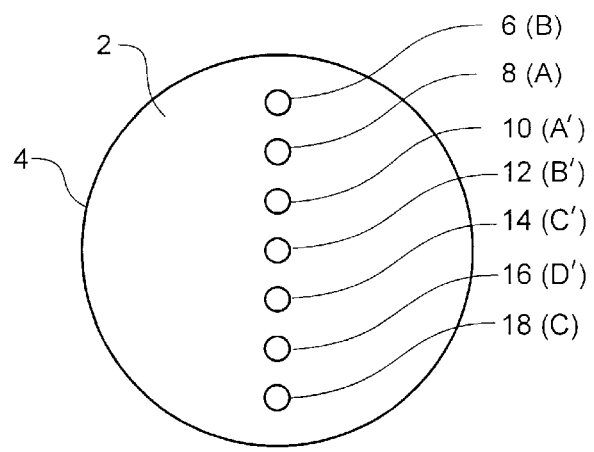
FIG. 1 a prior art output focal plane of a lens of a 4×4 cross-bar switch configuration having input and output locations along a diameter of the lens.

FIG. 1 shows an output focal plane 2 of a lens 4 of a prior art 4×4 cross-bar switch configuration having input and output locations along a diameter of lens 4. In a preferred embodiment lens 4 is a GRIN lens having a focal plane 2. Output focal plane 2 of lens 4 includes an output A' at position 10, output B' at position 12, output C' at position 14, and output D' at position 16. Each of the output locations A' to D' on lens 4 has an optical fiber appropriately coupled to it. To achieve a combination of signals of the prior art cross-bar switch return loops are required. Each of the return loops will route a signal received at the output focal plane 2 back to an input focal plane so that the operation of the cross-bar switch is achieved. FIG. 1 shows a configuration for orientation of the return loops showing input and output locations. The corresponding configuration for the return loops in output focal plane 2 are shown in FIG. 1. Return loop A is at position 8, return loop (B) is at position 6, and return loop (C) is at position 18. FIG. 1 shows clearly that the output locations are all lying along a diameter in the output focal plane 2 of the GRIN lens 4.

Figure 2:
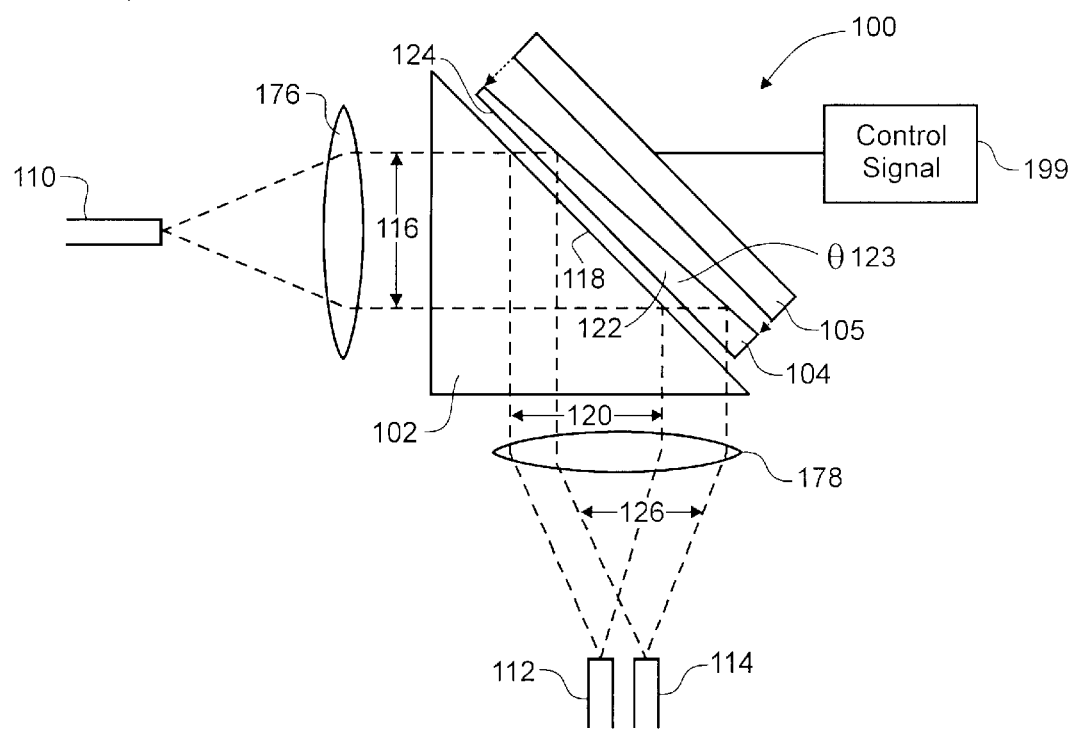
FIG. 2 depicts a prior art optical switch employing frustrated total internal reflection (FTIR)

Referring now to FIG. 2 a prior art optical switch, as disclosed in U.S. Pat. No. 5,444,801, utilizing frustrated total internal reflection (FTIR) is shown. This FTIR optical switch 100 includes a lens 176 and another lens 178. Switch 100 further includes refractor 102, a right angle prism, positioned between lenses 176 and 178. Switch 100 also includes a second refractor or switchplate 104 that is used to frustrate the total internal reflection in refractor 102. Switch 100 also includes actuator 105 for moving switchplate 104 into proximal contact with refractor 102, such as a piezo-electrical device. Input signals are provided to switch 100 by input fiber 110 located in the focal plane for lens 176, and output signals are provided to output fibers 112 and 114 located at the focal plane for lens 178.

In the first position of switch 100, switchplate 104 does not touch refractor 102. The energy from input fiber 110 is collimated into beam 116 by collimating lens 176 and beam 116 is introduced into refractor 102. Collimated input beam 116 is reflected at reflecting surface 118 of refractor 102 by total internal reflection and forms a primary collimated output beam 120. The primary collimated output beam 120 is focused by decollimating output lens 178 and to first output optical fiber 112.

To accomplish switching from input optical fiber 110 to second output optical fiber 114, switchplate 104 is brought into proximal contact with reflecting surface 118 of refractor 102 by actuator 105. This frustrates the total internal reflection in refractor 102 resulting in input collimated beam 116 being transmitted into switchplate 104. Collimated beam 116 is reflected from reflective surface 122 of switchplate 104 by total internal reflection as a secondary collimated output beam 126.

Reflective surface 122 of switchplate 104 is at a bias angle θ 123 to inside surface 124 of switchplate 104. Secondary collimated output beam 126 leaves refractor 102 at an angle of two times angle θ 123 to that of primary collimated output beam 120. Secondary collimated output beam 126 is then reimaged by output lens 178 onto second output optical fiber 114. By this method, an optical signal at input optical fiber 110 can be switched between output optical fibers 112 and 114 by moving switchplate 104 into and out of proximal contact with refractor 102. When switchplate 104 is not in proximal contact with refractor 102, the optical signal from input optical fiber 110 is imaged to first output optical fiber 112. When switchplate 104 is brought into proximal contact with refractor 102, total internal reflection in refractor 102 is frustrated, thereby causing the optical signal from input optical fiber 110 to be imaged to second output optical fiber 114.

The switchplate 104 in FIG. 2 is depicted as a wedged plate which is put in contact with the refractor/prism 102 to change the beam path.

U.S. Pat. No. 5,444,801 to Laughlin uses total internal reflection to deflect a beam into a single GRIN lens that has pickup fibers along a diameter of the GRIN lens. Hence, Laughlin varies the position of a wedge on a transmissive block to deflect a beam at different angles. However, the collimated output beam 126 does not strike the center of the lens 178 and partially misses the GRIN lens when it s deflected.

In accordance with an embodiment of the present invention an apparatus and a method are provided that use a lens more efficiently. Further, in accordance with another embodiment of the invention more switching positions are provided than in prior art optical deflection switches, such as the one disclosed by Laughlin. In accordance with an embodiment of the present invention an output beam is directed to the center of the lens while still switching to a plurality of fibers. For example, the output beam is switched to a plurality of output locations on the lens such as to locations having a same distance from an optical axis of the lens, e.g. 10 fibers equidistant from the optical axis.

Figure 3A:
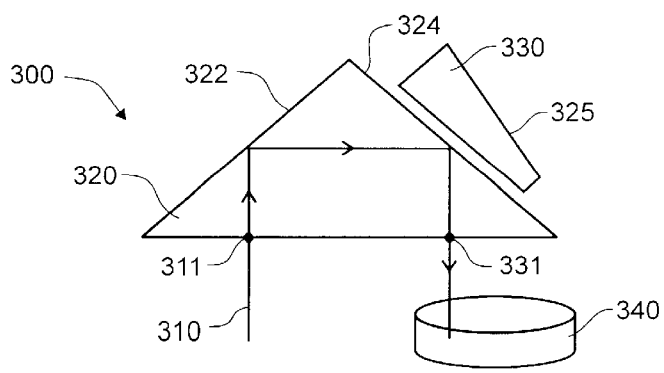
FIGS. 3A to 3C the operation of a prior art optical switch.

FIGS. 3A to 3D illustrate the prior art and FIGS. 4A to 4D illustrate the present invention in a more detailed manner. Turning to FIG. 3A an optical switch 300 is shown including a first refractor 320, such as a prism, a second refractor 330, such as a wedge, a lens 340, and a switch (not shown) for optically coupling the first refractor 320 with the second refractor 330. In a preferred embodiment lens 340 is a GRIN lens and the first refractor 320 is a 45-90-45 prism. Alternatively, other configurations of the first refractor 320 can be employed without departing from the scope of the present invention. The second refractor 330 of optical switch 300 is used to frustrate the total internal reflection of refractor 320. The first refractor 320 and the second refractor 330 are made of a light transmissive material having substantially a same refractive index. The second refractor 330 is wedge shaped and adjacent to face 324 of the first refractor 320.

FIG. 3A shows a beam of light 310 being launched into the first refractor 320 at an input location 311. The beam of light 310 propagates through the first refractor 320 and is reflected at face 322 and face 324 and then exits the first refractor 320 at an output location 331.

Figure 3B:
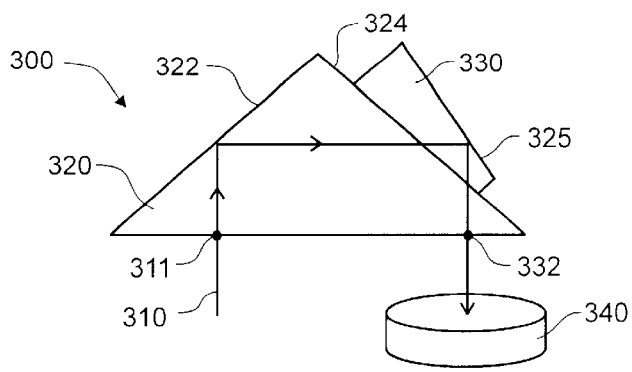

Again, FIG. 3B shows a beam of light 310 being launched into the first refractor 320 at an input location 311. The beam of light 310 propagates through the first refractor 320 and is reflected at face 322. However, in FIG. 3B the first refractor 320 and the second refractor 330 are optically coupled such that light is allowed to propagate into the second refractor 330 where it is reflected at face 325. The beam of light 310 exits the first refractor 320 at an output location 332. Output location 332 is shifted to the right in comparison to output location 331 of FIG. 3A.

Figure 3C:
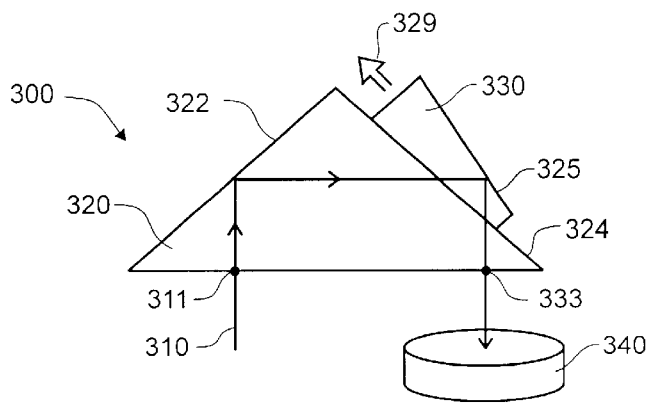

FIG. 3C shows a beam of light 310 being launched into the first refractor 320 at an input location 311. The beam of light 310 propagates through the first refractor 320 and is reflected at face 322. FIG. 3C shows the second refractor 330 being optically coupled with the first refractor 320 and shifted in the direction of arrow 329. This shift shortens the path length of the beam while travelling through the second refractor 330. Hence, the beam of light 310 exits the first refractor 320 at an output location 333. Output location 333 is located output location 331 and output location 332.

Figure 3D:
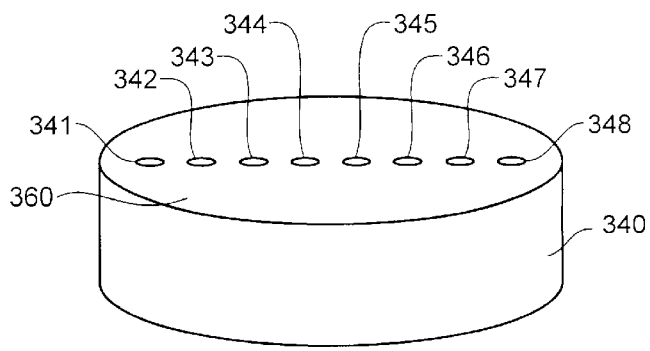
FIG. 3D shows a plurality of output locations for an output focal plane associated with a lens.

FIG. 3D shows a plurality of output locations for an output focal plane 360 associated with lens 340. Using an optical switch as shown in FIGS. 3A to 3C the beam of light 310 is switched to positions 341 to 348, for example. All switching positions 341 to 348 are located along a diameter of the output focal plane 360 associated with lens 340.

Turning now to FIGS. 4A to 4D it is understood how the present invention uses an output focal plane of a lens more efficiently and how it provides more switching positions than prior art optical switches, such as optical switch 300 shown in FIGS. 3A to 3C.

Figure 4A:
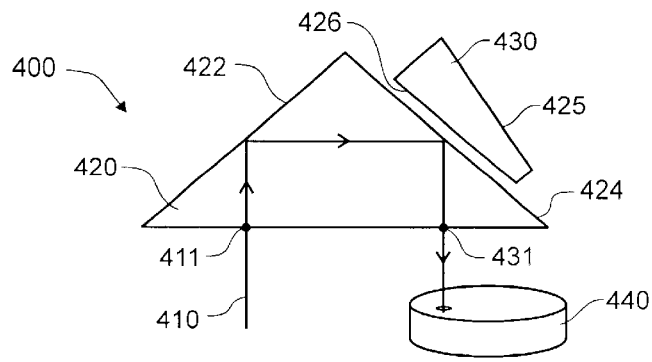
FIGS. 4A to 4C show the operation of an optical deflection switch in accordance with the present invention.

Turning to FIG. 4A an optical switch 400 is shown including a first refractor 420, such as a prism, a second refractor 430, such as a wedge, a lens 440, and a switch (not shown) for optically coupling the first refractor 420 with the second refractor 430. In a preferred embodiment lens 440 is a GRIN lens and the first refractor 420 is a 45-90-45 prism. Alternatively, other configurations of the first refractor 420 can be employed without departing from the scope of the present invention. The second refractor 430 of optical switch 400 is used to frustrate the total internal reflection of refractor 420. The first refractor 420 and the second refractor 430 are made of a light transmissive material having substantially a same refractive index. The second refractor 430 is wedge shaped and adjacent to face 424 of the first refractor 420.

FIG. 4A shows a beam of light 410 being launched into the first refractor 420 at an input location 411. The beam of light 410 propagates through the first refractor 420 and is reflected at face 422 and face 424 and then exits the first refractor 420 at an output location 431.

Figure 4B:
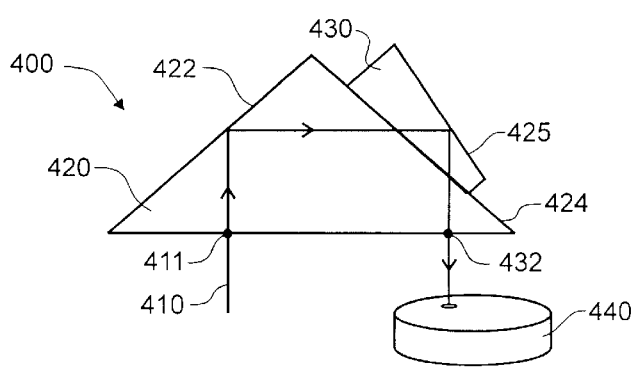

Again, FIG. 4B shows a beam of light 310 being launched into the first refractor 320 at an input location 311. The beam of light 310 propagates through the first refractor 320 and is reflected at face 322. However, in FIG. 3B the first refractor 320 and the second refractor 330 are optically coupled such that light is allowed to propagate into the second refractor 330 where it is reflected at face 325. The beam of light 310 exits the first refractor 320 at an output location 332. Output location 332 is shifted to the right in comparison to output location 331 of FIG. 3A.

Figure 4C:
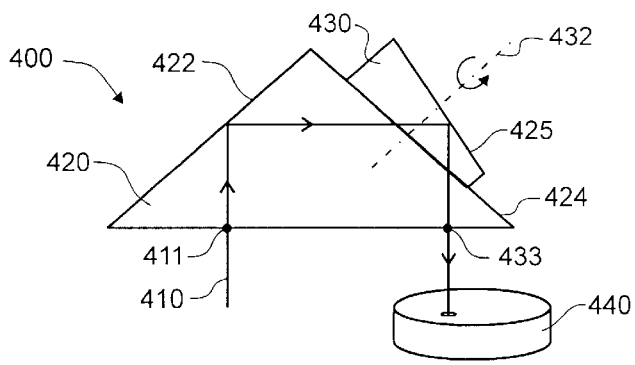

FIG. 4C shows a beam of light 410 being launched into the first refractor 420 at an input location 411. The beam of light 410 propagates through the first refractor 420 and is reflected at face 422. FIG. 4C shows the second refractor 430 being optically coupled with the first refractor 420. However, instead of shifting the second refractor 430 it is rotated around a rotational axis 432. The rotation around axis 432 alters a plane of incidence of the beam of light 410 when being reflected from face 425. Thus, for each rotational increment an incident and a reflected ray have a different plane of incidence. As a result the beam of light 410 when exiting refractor 420 and entering lens 440 is more confined to a center of the lens 440 while still being able to switch to a plurality of fibers.

Figure 4D:
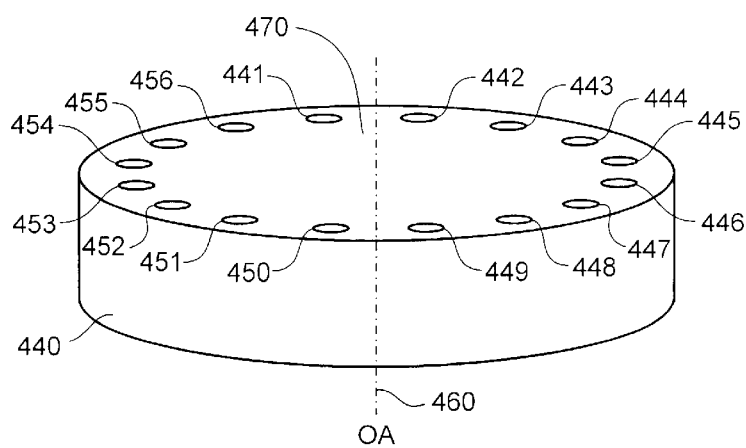
FIG. 4D shows a plurality of output locations for an output focal plane 470 associated with lens 440.

FIG. 4D shows a plurality of output locations for an output focal plane 470 associated with lens 440. Using an optical switch as shown in FIGS. 4A to 4C the beam of light 410 is switched to positions 441 to 456, for example. The switching positions 441 to 456 in FIG. 4D are no longer located along a diameter of the output focal plane 470 associated with lens 340 but rather are arranged equidistant from an optical axis 460. It is appreciated by those skilled in the art that other switching positions having another different distance from the optical axis are obtained, if desired, by appropriate rotation of the second refractor 430.

Figure 5:
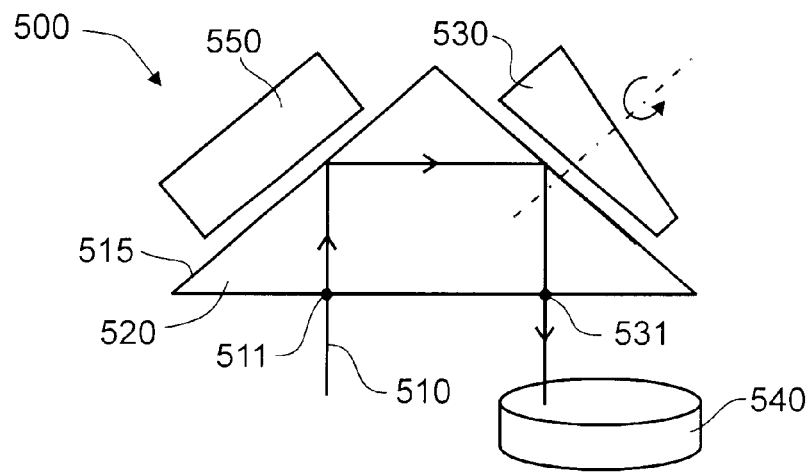
FIG. 5 shows an optical deflection switch in accordance with an embodiments of the present invention.

FIG. 5 shows an optical deflection switch 500 in accordance with an embodiment of the present invention having a third refractor 550. Refractor 550 is cuboid and made from a light transmissive material and has substantially the same refractive index as the first refractor 520 and the second refractor 530. If the third refractor 550 is optically coupled with the first refractor 520 such that a beam of light 510 being launched into the first refractor at an input location 511, is allowed to propagate into the third refractor to frustrate the internal reflection of the beam 510. If the third refractor 550 is optically coupled with the first refractor 520 twice the number of switching positions result as in comparison to the optical deflection switch 400 shown in FIGS. 4A to 4D.

Figure 6:
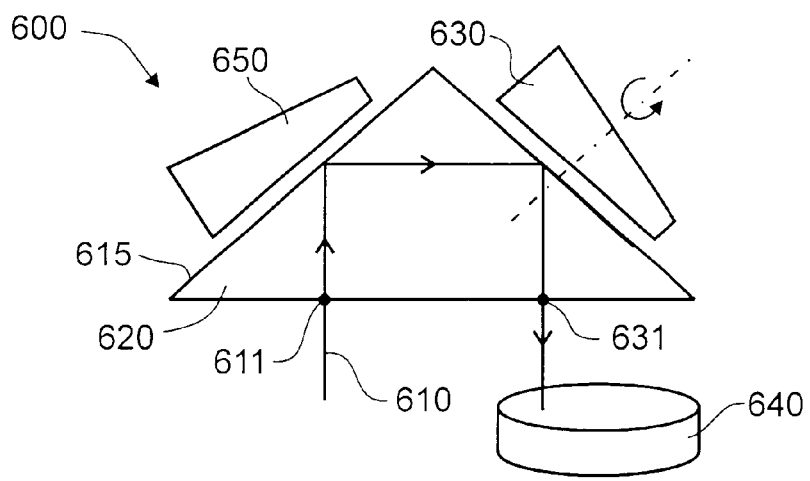
FIG. 6 shows an optical deflection switch in accordance with another embodiment of the present invention.

FIG. 6 shows an optical deflection switch 600 in accordance with another embodiment of the present invention. Refractor 650 is wedge shaped and made from a light transmissive material and has substantially the same refractive index as the first refractor 620 and the second refractor 630. If the third refractor 650 is optically coupled with the first refractor 620 such that a beam of light 610 being launched into the first refractor at an input location 611, is allowed to propagate into the third refractor to frustrate the internal reflection of the beam 610. If the third refractor 650 is optically coupled with the first refractor 620 more than twice the number of switching positions result as in comparison to the optical deflection switch 400 shown in FIGS. 4A to 4D.

Furthermore it is an advantage to switch an input optical signal to a plurality of output locations by means of rotating the second refractor being optically coupled with the first refractor since a rotational movement is more accurate than sliding a wedge shaped refractor. The feedback is tuned more easily for a rotational movement of the second refractor.

The above-described embodiments of the invention are intended to be examples of the present invention and numerous modifications, variations, and adaptations may be made to the particular embodiments of the invention without departing from the scope and spirit of the invention, which is defined in the claims.

What is claimed is:

1. An optical deflection switch comprising:
   a) a tapered block of a light-transmissive material having a reflective surface and a second face, the second face including an input/output port and the reflective surface for providing reflection of a beam of light passing through the input/output port into the tapered block;

b) a first block of a light-transmissive material having a first face and a second face, the first face including an input port thereon for receiving a collimated beam of light and the second face for providing total internal reflection of the beam of light in a first switching state and for acting as an output/input port for optical communication with the input/output port of the tapered block when the total internal reflection is frustrated in a second switching state, and an angle defined between the reflective face of the tapered block and the second face of the first block being other than zero; and c) a rotator for turning the tapered block around an axis into one of a plurality of selectable positions, each of the plurality of selectable positions for changing a plane of incidence of the beam of light.

2. An optical deflection switch as defined in claim 1 further comprising a switch for selectively switching the tapered block relative to the first block from the first switching state to the second other switching state.

3. An optical deflection switch as defined in claim 2 wherein the switch is for moving the tapered block for allowing optical coupling to the first block in order to frustrate internal reflection in the second switching state and for moving the tapered block to a second other position other than being optically coupled with the first block in the first switching state.

4. An optical deflection switch as defined in claim 2 wherein the axis is at a center of the tapered block.

5. An optical deflection switch as defined in claim 2 wherein the reflective surface is a face of the tapered block and provides reflection through total internal reflection.

6. An optical deflection switch as defined in claim 5 wherein the reflective face of the tapered block and the second face of the first block define an angle between each other, said angle being other than zero.

7. An optical deflection switch as defined in claim 6 wherein the angle is such that a normal to the reflective surface of the tapered block bisects another angle defined between a beam passing into the tapered block from the first block and a beam reflected from the reflective surface of the tapered block.

8. An optical deflection switch as defined in claim 1 wherein the tapered block and the first block have substantially a same refractive index.

9. An optical deflection switch as defined in claim 8 wherein the first block of-light transmissive material is a prism.

10. An optical deflection switch as defined in claim 9 wherein the prism is a 45-90-45 degree prism.

11. An optical deflection switch as defined in claim 1 wherein the reflective surface is disposed within the tapered block, said reflective surface having a different refractive index than the first block.

12. An optical deflection switch as defined in claim 11 wherein the reflective surface is a metal layer.

13. An optical deflection switch as defined in claim 11 wherein the reflective surface is a layer of air.

14. An optical deflection switch as defined in claim 13 wherein the layer of air is selectably replaceable with a fluid.

* * * * *